United States Patent [19]
Howard

[11] 3,877,591
[45] Apr. 15, 1975

[54] APPARATUS FOR MOVING VEHICLES

[76] Inventor: John J. Howard, 5925 Cecilia St., Bell Gardens, Calif. 90201

[22] Filed: June 10, 1974

[21] Appl. No.: 477,800

[52] U.S. Cl............ 214/86 A; 180/26 R; 280/34 R
[51] Int. Cl.................................. B60p 3/06
[58] Field of Search........ 214/86 R, 86 A, 331, 332, 214/333; 280/43.12, 34 R; 180/14 R, 26 R

[56] References Cited
UNITED STATES PATENTS

| | | | |
|---|---|---|---|
| 1,650,810 | 11/1927 | Weaver............................ | 214/332 X |
| 2,380,415 | 7/1945 | Carruthers......................... | 214/333 |
| 2,541,494 | 2/1951 | Bryan................................ | 214/331 |
| 2,699,267 | 1/1955 | Beamer............................. | 214/86 A |
| 2,726,777 | 12/1955 | Wiley................................ | 214/86 A |
| 3,152,704 | 10/1964 | Russell.............................. | 214/86 A |
| 3,434,607 | 3/1969 | Nelson.............................. | 214/86 A |
| 3,599,811 | 8/1971 | Watkins............................. | 214/86 A |
| 3,690,482 | 9/1972 | Gaumont.......................... | 214/86 A |
| 3,828,953 | 8/1974 | Reznicek.......................... | 214/332 |

*Primary Examiner*—Kenneth H. Betts
*Attorney, Agent, or Firm*—Dominick Nardelli

[57] ABSTRACT

An apparatus for moving vehicles is disclosed wherein the apparatus has a frame with two arms extending rearward therefrom. The arms are pivotably connected to the frame in a scissor-like fashion. To the underside of the frame is mounted a turret mounting means for supporting a wheel that is preferably power driven. The turret mounting means allows the wheel to rotate 360° about a vertical axis while it also is capable of rotating on a horizontal surface. The end of each arm is supported by, for example, two casters, one on each side of the respective arm, and each end is supplied with means for engaging a respective wheel on the vehicle and for raising the respective wheel off the ground so that only two wheels of a 4-wheel vehicle rests on the ground. Means are provided to control the scissor-like action between the two arms so that various axle lengths are accommodated by the device. In addition, means are provided to lock the four casters so that they roll only in the forward and rearward direction when the apparatus is not pulling or pushing a vehicle.

14 Claims, 7 Drawing Figures

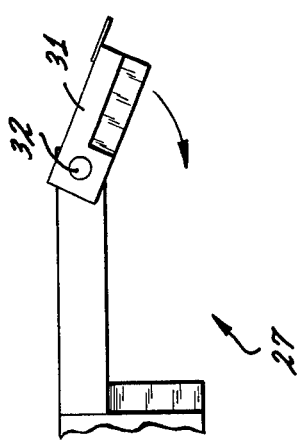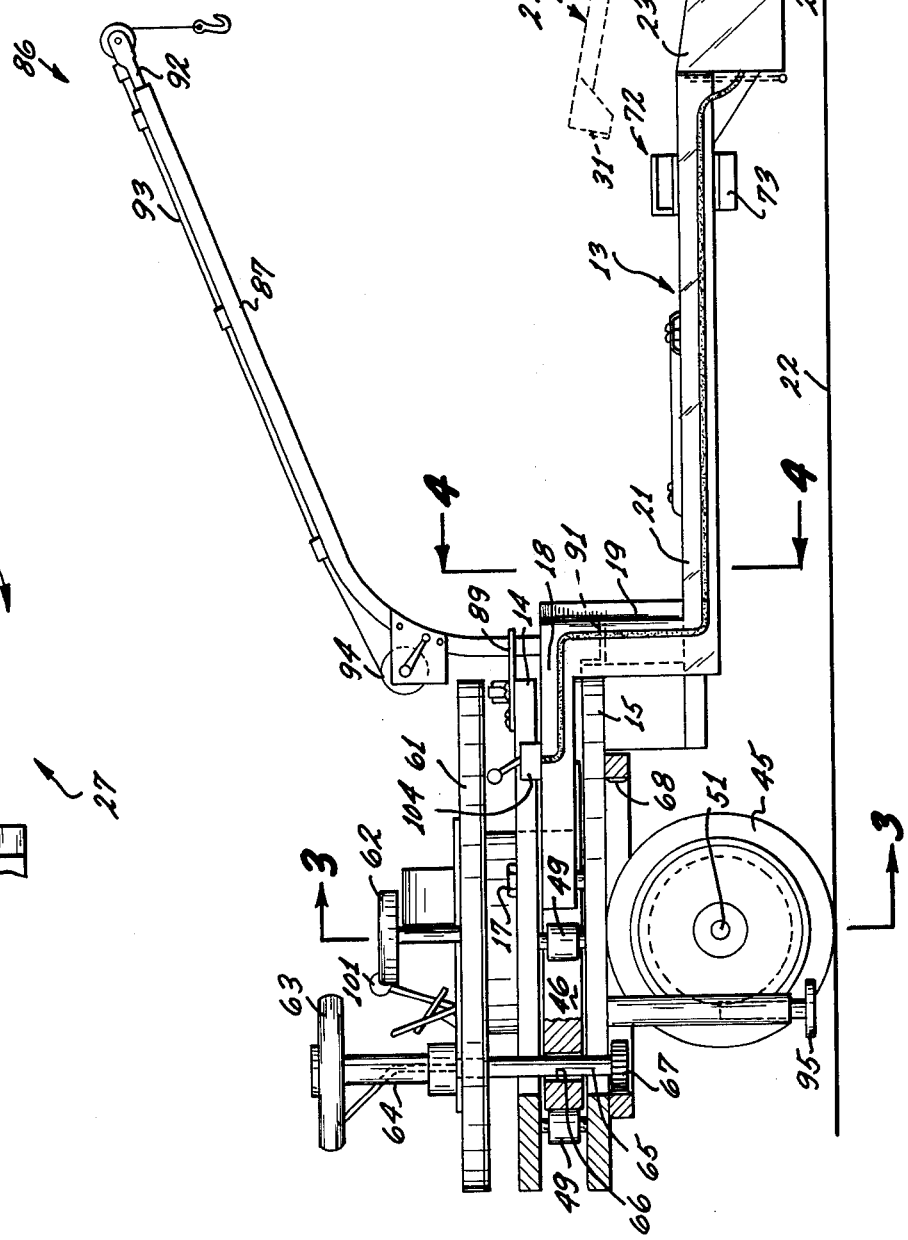

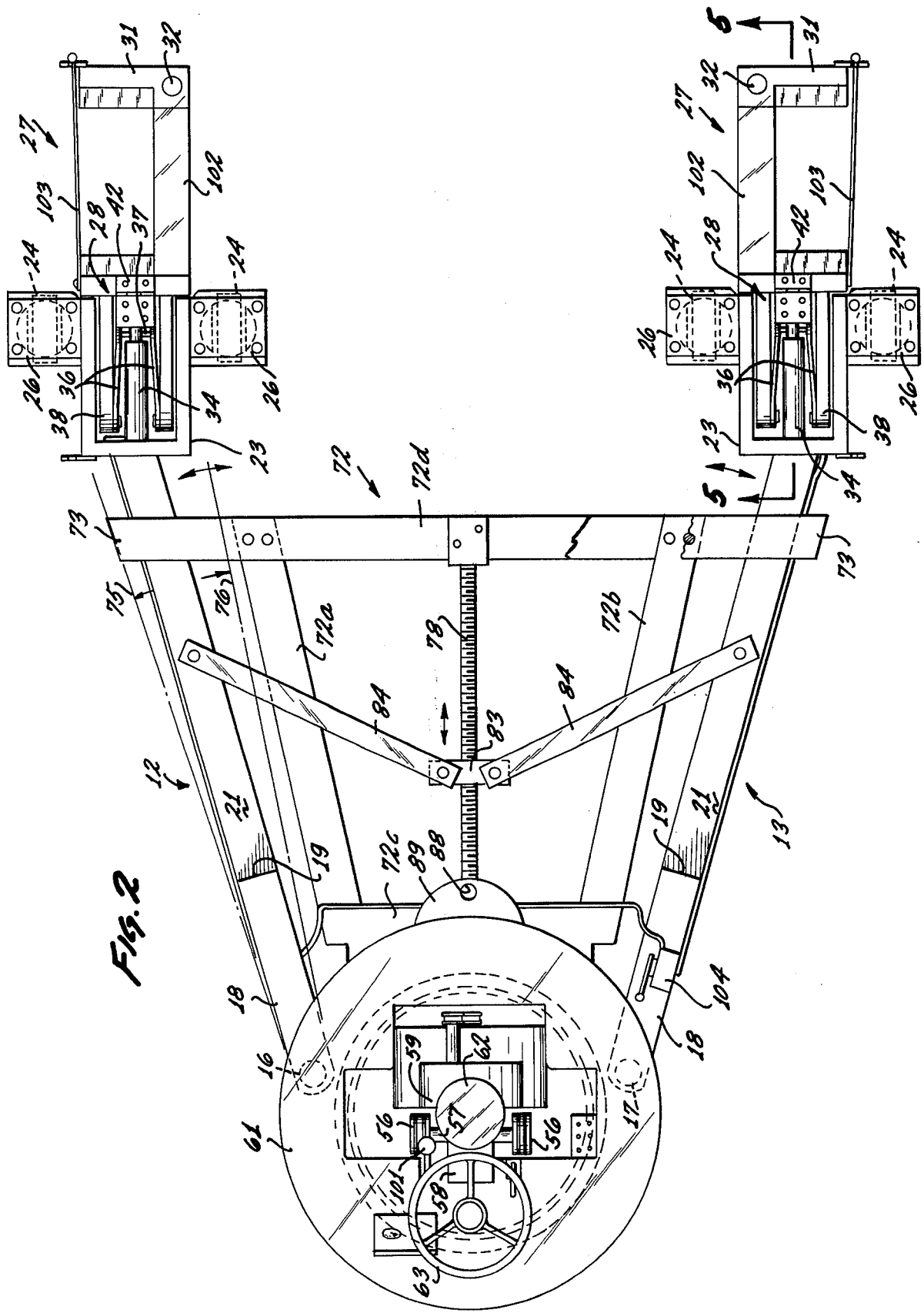

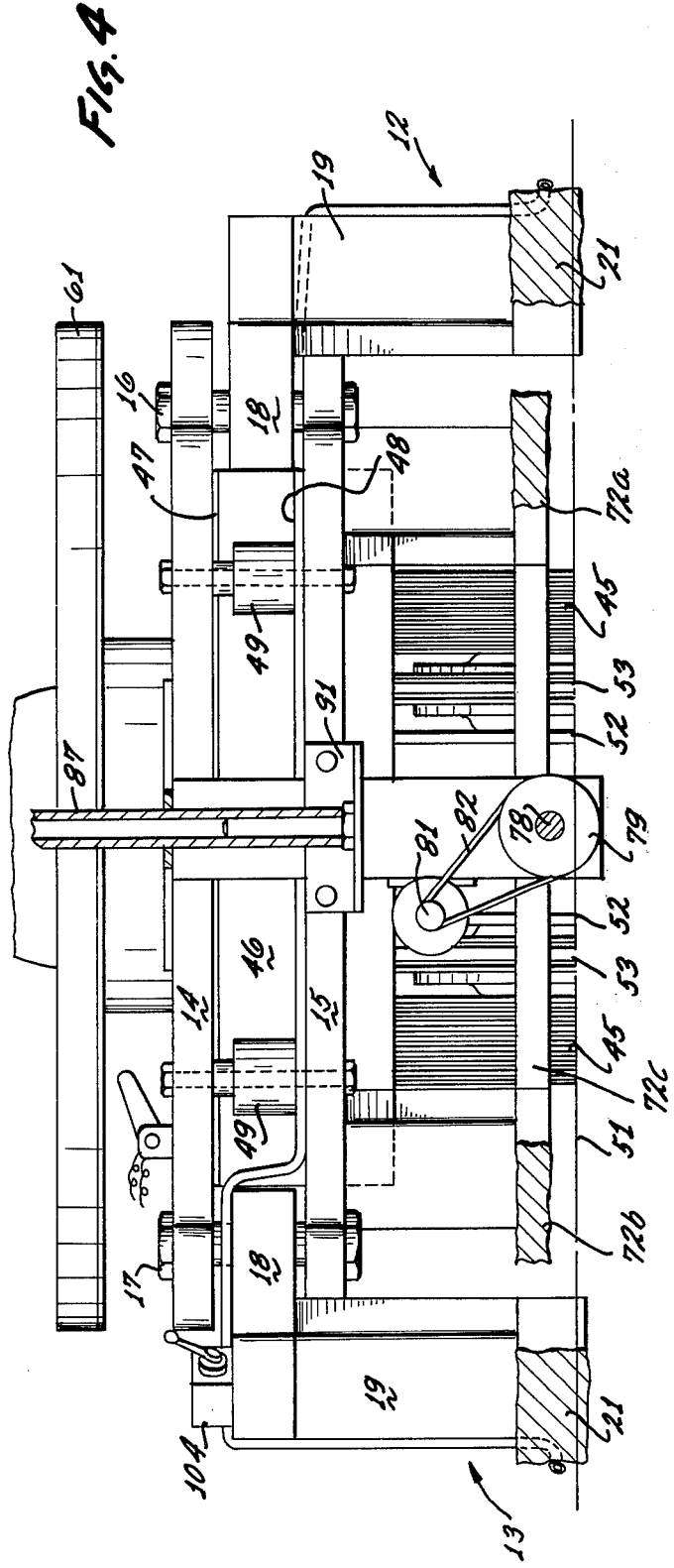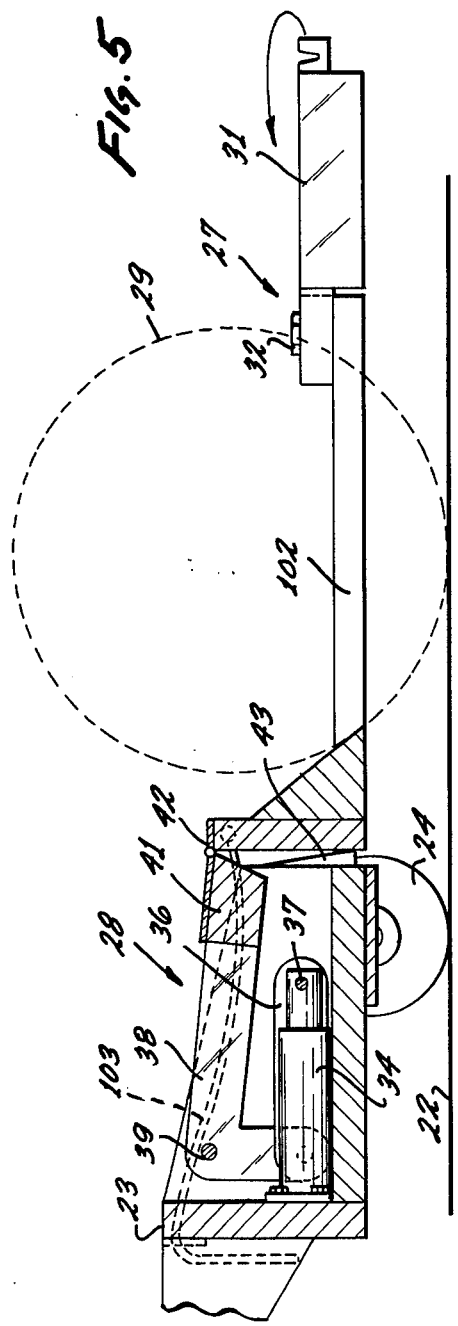

3,877,591

APPARATUS FOR MOVING VEHICLES

FIELD OF THE INVENTION

This invention relates to an apparatus for moving heavy wheeled vehicles and, more particularly, to a small economical self-powered apparatus which can be operated by a single operator and is capable of lifting one end of the vehicle by its wheels so that the vehicle rests on no more than two wheels, thereby allowing the vehicle to be towed from place to place.

BACKGROUND OF THE INVENTION

In parking lots, garages, repair depots, etc., vehicles, especially automobiles, need, on occasion to be moved about when their engines are inoperable. Since in many cases the space available to maneuver the vehicles is small, one would not attempt to employ expensive road type tow trucks to move them about, because these tow trucks are expensive and relatively large and require lots of room in which to maneuver about. Moving the vehicles by hand would be impractical and expensive because up to 4 strong men may be needed to push the vehicles around. In addition, moving the vehicles by hand limits the maneuverability of the vehicles as one is limited to the turning radius of the front wheels of the vehicle. For example, an automobile cannot be made to pivot about a vertical axis crossing one of its axles.

OBJECTS OF THE INVENTION

An object of the invention is to provide a compact, inexpensive apparatus that can be powered for moving about disabled vehicles, especially in tight quarters.

Another object of this invention is to provide an apparatus that readily engages some of the wheels of a vehicle and lifts the vehicle by raising said wheels off the ground.

Another object of this invention is to provide an apparatus with a frame, with two arms extending rearward therefrom, and a wheel mounted under the frame, which wheel can be rotated 360° about a vertical axis.

Another object of this invention is to provide, to the above object, means for pivoting the wheel about the vertical axis.

These and other objects and features become more apparent after studying the following description of the preferred embodiment of the invention, together with the appended drawings.

Brief Description of the Drawings:

FIG. 1 is a left side elevation of my novel apparatus.

FIG. 2 is a plan view of the apparatus shown in FIG. 1.

FIG. 4 is a sectional view taken substantially on line 4—4 of FIG. 1, and in the direction of the arrows.

FIG. 5 is a sectional view taken substantially on line 5—5 of FIG. 2.

FIG. 7 is a fragment of the apparatus showing how a vehicle's wheel is to be locked in position.

DETAILED DESCRIPTION OF THE DRAWINGS

Figure 3:
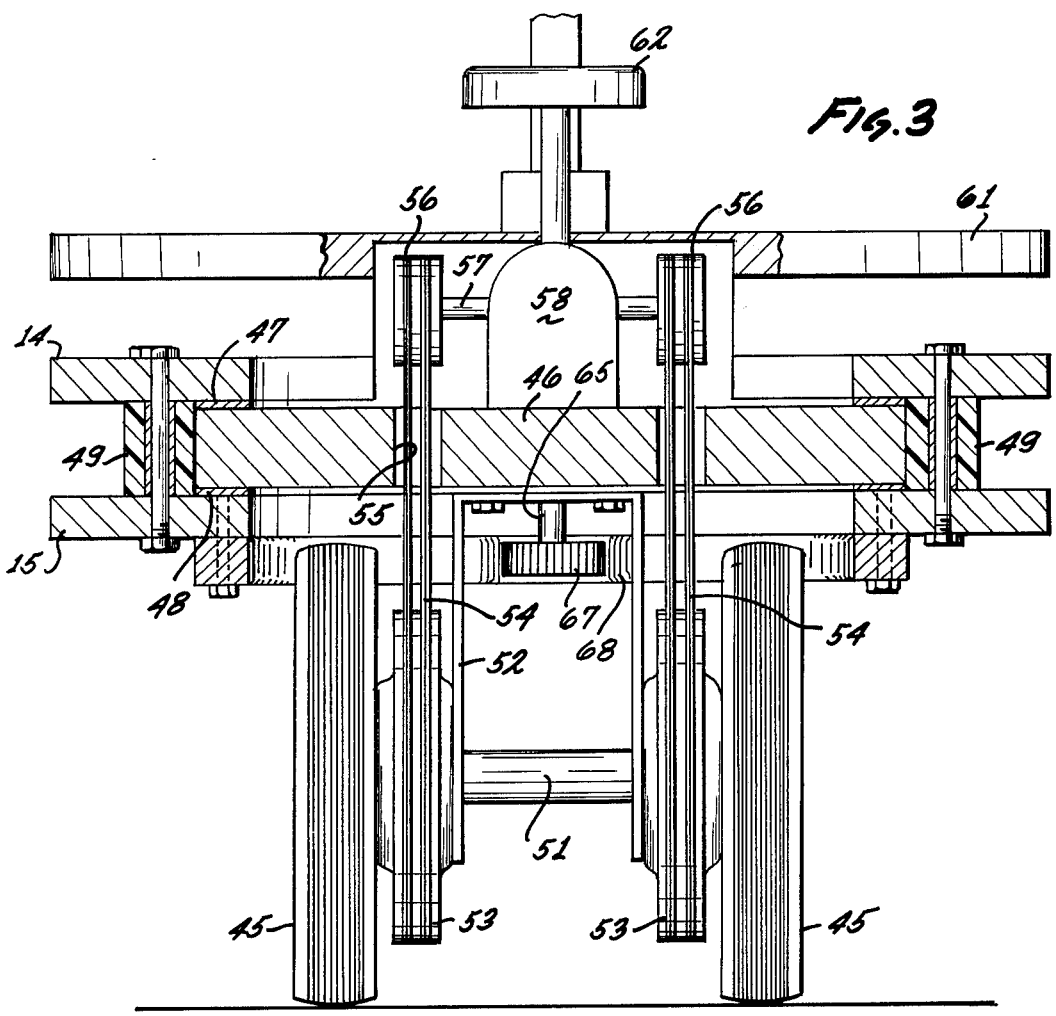
FIG. 3 is a sectional elevation taken substantially on line 3—3 of FIG. 1.

Referring to FIGS. 1, 2, and 3, in particular, the apparatus has a frame which includes a pair of coaxial annular plates 14 and 15, and a right arm 12 and a left arm 13, preferably pivotably connected thereto by pins 16 and 17 respectively (pin 17 is more clearly shown in FIG. 1). For convenience, each arm 12 and 13 is bent, as shown in FIG. 1 for arm 13, wherein a horizontal member 18 is pin-connected to pin 17 and a vertical member 19 depends therefrom. To the lower end of member 19, a horizontal finger 21 is fixed so that it lies near the ground, as represented by a ground line 22. On the end of each finger 21 is fixed, by one end, an open box 23 having an open top and an open opposite end, as shown. On opposite sides of each box 23 are fixed a pair of casters 24. In order that the bottom of the box 23 may be only a few inches off the ground and still be able to use relatively large casters, so that the casters can jump relatively large irregularities in the floor (for example, 1 inch), two casters are used for each arm, with the top of the caster mounted under a pair of wing plates 26, welded to and extending from both sides, respectively, of the box 23. Movably mounted to each box 23 is a wheel cradle means 27. When looking down on means 27, in FIG. 2 it appears to have a C-shape so that it can cradle a wheel 29, as shown by the dash lines in FIGS. 5 and 6. In order to facilitate cradling the wheel, as will be explained hereinafter, the means 27 has a swingable arm 31 on the far end capable of pivoting about a vertical pin 32, as shown in FIG. 7. Within each box 23 is disposed a lifting means 28 (FIGS. 5 and 6), for lifting a respective cradle means 27 off the ground. The lifting means 28 has a hydraulic cylinder and piston assembly 34, horizontally disposed, the piston of which is connected to a pair of links 36 by pin 37. Each link 36 is connected to a bell crank 38, which is pivotable about a respective pin 39. The other arm of each pair of bell cranks 38 is made integral with a block 41 disposed therebetween, which is in turn suitably hinged to cradle means 27 by a hinge 42. Now, when the piston and assembly 34 is extended to the position shown in FIG. 6, the bell crank rotates counter-clockwise as viewed in FIG. 6, lifting the cradle means 27, as shown in that figure. Each open box 23 is provided with wedges 43 to insure that the cradle means 27 lifts substantially horizontally. The hinge 42 allows one to lift the cradle means 27 to a stow position, as shown by dash line 27a in FIG. 1.

As the four casters 27 support the rearward ends of arms 12 and 13 and the cradle means 27, a pair of wheels 45, swiveable about a vertical axis, supports the frame and, more particularly, the annular plates 14 and 15. The wheels 45 are made swivelable by suitable turret means and this arrangement allows one to steer or direct the apparatus where desired. The means for providing swivelability to wheels 45 will now be described. As one will note, especially in FIGS. 1, 3, and 4, the annular plates 14 and 15 are coaxial, but also spaced axially apart so that disposed therebetween, in journalled relationship is a circular mounting plate 46. Suitable annular journalled thrust bearings 47 and 48 (FIG. 3) are provided between plates 14 and 46, and between plates 15 and 46, respectively. A plurality of suitable radial bearings 49 are provided around plate 46 and between plates 14 and 15 to permit plate 46 to rotate only about the vertical axis which is coaxial to all 3 plates 14, 15, and 46. The pair of wheels 45 are suitably bearing mounted to an axle 51, which is in turn mounted to a fork 52 depending below plate 46. To each wheel 45 is fixed a chain sprocket 53, each of which is driven by chain 54. Chains 54 could be belts, if desired, and the sprockets could be pulleys. The chains 54 extend up through convenient openings 55 in plate 46 to engage sprockets 56 which are in turn mounted on the end of drive axles 57 that extend from a standard differential gear box 58 (FIG. 1) which is in turn powered by a suitable engine 59 (FIG. 2). For convenience and safety, the apparatus is provided with a round cover plate 61 that is suitably mounted to rotate with plate 46. Above the plate 61 is disposed a seat 62 for an operator with a steering wheel 63 and a steering column 64. Within the column 64 is a rotatable shaft 65 that extends down from wheel 63 through both annular plates 14 and 15, and through a suitable bore 66 (FIG. 1) in plate 46. A pinion gear 67 is mounted on the lower end and engages a large ring gear 68 bolted (FIG. 3) to the underside of an annular plate 15.

Since the pair of cradle means 27 can move towards and away from each other, due to the function of pins 16 and 17, an adjustable means is provided to perform this function under control of the operator. As shown in FIG. 4, fixed to the underside of plate 15 is a trapezoidal frame 72 (FIG. 1) with two non-parallel sides 72a and 72b, and 2 parallel sides 72c and 72 d. Side 72d has forked ends 73 (FIG. 1), each of which accommodate a respective arm 12 or 13, or more particularly the horizontal fingers 21, so that the fingers 21 pivot between 2 extremes as shown by dash lines 75 and 76 (FIG. 2). In between the sides 72c and 72d is disposed a threaded bar 78, bearing mounted at one end to side 72c and at the other end to side 72d. Near side 72c a pulley 79 (FIG. 4) is fixed to bar 78, and, in turn, the pulley 79 is coupled to a power takeoff pulley 81 by a belt 82. The power takeoff pulley is, of course, coupled to the gear box which is in turn coupled to the motor in a standard manner. Threaded on bar 78 is a nut 83 (FIG. 2), to which a pair of links 84 extend to respective fingers 21, as shown in FIG. 2. Now, whenever the nut 83 moves axially along the bar 78, the cradle means 27 moves toward or away with respect to each other.

The apparatus lends itself to be incorporated with a boom hoist 86, very simply. A boom 87 shaped, for example, as shown in FIG. 1, is nested into a socket 88 (FIG. 2) borne by plate 89 bolted to plate 14 and an angle bracket 91. The boom 87 has a telescoping section 92 and a standard cable 93 and reel 94 arrangement that is useful to lift heavy objects. Suitable outriggers 95 are provided, as is standard in the art, to prevent tipping whenever a heavy load on the end of the boom 87 is being lifted.

Description of the Operation

Figure 6:
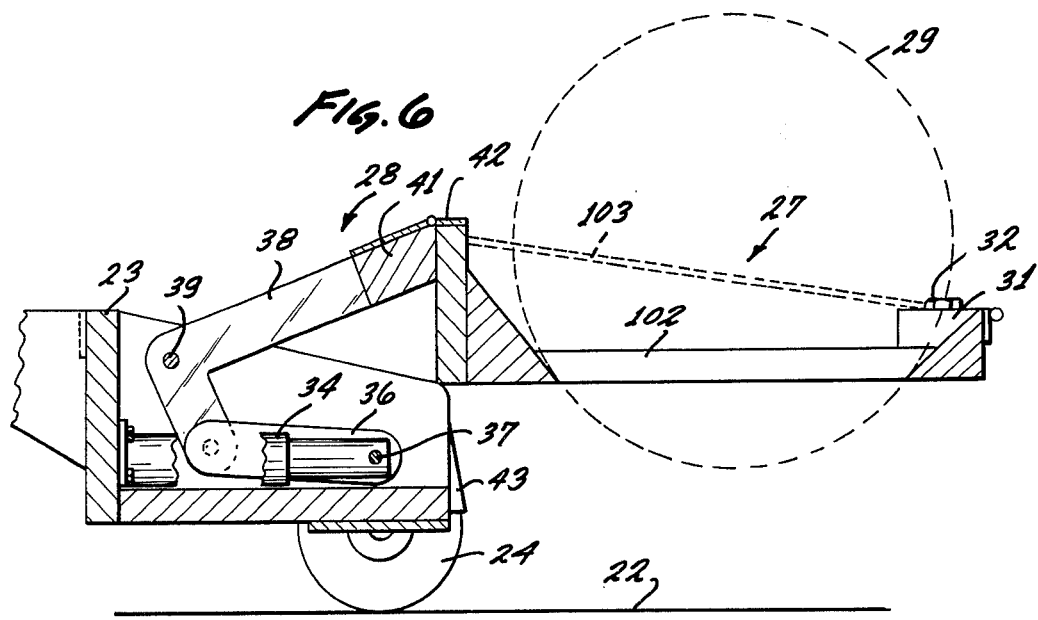
FIG. 6 is the same view as FIG. 5, showing how a towed vehicle's wheel is lifted.

To use the apparatus, both cradle means 27 are placed in the position shown in FIG. 5, parallel with the ground, and swingable arms extending rearward. The distance between both cradle means 27 is adjusted by turning screw 78. This can be done in a standard manner through the gear box 58, having a gear handle 101 so that pulley 81 is made to rotate. When the distance therebetween is such that both cradle means 27 can be directed under the vehicle between both front wheels, or the back wheels, screw bar 78 is stopped. The distance should be such that the bar 102, on each means 27, is almost touching the inside of the respective wheel when the cradle means 27 are under the vehicle. Then arms 31 are pivoted to the position shown in FIG. 2 with the respective wheels between arms 31 and hinge 42. The arms 31 are locked in place by a suitable tension member 103, for example, a chain. The piston in each cylinder and piston assembly 34 is extended by actuating, for example, a hydraulic valve 104 to cause the wheels 29 of the vehicle to be lifted off the ground as shown in FIG. 6. Of course, the apparatus is provided with a hydraulic pump, which is coupled to the motor in a standard manner. With the two wheels of the vehicle (which is not shown) off the ground, the vehicle can be moved. The operator sitting on seat 62, and his hand on the steering wheel 63, places the apparatus into gear by actuating the gear shift handle 101. Power is supplied to the pair of wheels 45 through drive chains 54. The four casters 24, being swivelable, allows the vehicle to be towed around within close quarters. This apparatus allows one to swing a vehicle about a vertical axis disposed midway between the vehicles' wheels that are on the ground. When a vehicle is towed to the desired place, the valve 104 is actuated to cause the piston and cylinder assembly 34 to retract and the wheels 29 to set on the ground. The chains 103 are released and arms 31 are swung out of the way. The cradle means 27 are removed from under the vehicle. Since the four casters 24 swivel, other suitable means, not shown, are preferably used to lock the casters to rotate only backwards and forwards. These locking means are useful when one attempts to move the apparatus without a vehicle in tow.

Having described the preferred embodiment of my invention, one skilled in the art, after reading the above disclosure, could device other embodiments without departing from the spirit and scope of my invention. Therefore, my invention is not to be considered to be limited to the disclosed embodiment, but includes all embodiments falling within the scope of the appended claims.

I claim:

1. An apparatus for towing a wheeled vehicle, having a plurality of wheels comprising:
   a frame;
   a pair of arms mounted to said frame to extend horizontally and forming an acute angle therebetween;
   a wheel means including a wheel and mounted under said frame to pivot with respect thereto about a vertical axis;
   a caster capable of pivoting also about a vertical axis and disposed under each arm to support said respective arm;
   a cradle means for engaging one of the wheels on said vehicle; and
   mounting means for mounting said cradle means on the end of each of said respective arms, and including means for lifting said cradle means with respect to said respective arm to lift the respective wheel on said vehicle.

2. The apparatus of claim 1, wherein:
   said frame has at least one annular plate;
   said wheel means having a round plate, bearing mounted coaxially onto said annular plate to rotate therewith;
   said wheel of said wheel means is mounted to said round plate to rotate about a horizontal axis perpendicular to said round plate;
   a power means is mounted to said round plate; and means are provided for coupling power from said power means to said wheel of said wheel means.

3. The apparatus of claim 2, wherein:
   said frame has two axially spaced annular plates, axially aligned on said vertical axis;

a plurality of rollers are mounted between said annular plates, equally distant from the vertical axis thereof, and disposed to rotate about respective axes which are parallel to said vertical axis thereof;

said round plate is disposed coaxially between said annual plates;

thrust bearings are provided between each of said annular plates and said round plate.

4. The apparatus of claim 3 wherein:

a pair of pins are disposed on opposite sides of said annual plates and extending therebetween;

said arms are pivotably connected to said pins, respectively; and means are provided to move said arms towards and away from each other, in scissor-like fashion, and to lock said arms with respect to each other, and said frame.

5. The apparatus of claim 2 wherein:

said arms are mounted to said frame to allow said arms to move toward and away from each other in a scissor-like action.

6. The apparatus of claim 1 wherein:

said arms are mounted to said frame to allow said arms to move toward and away from each other in a scissor-like action.

7. The apparatus of claim 1 wherein said mounting means comprises:

a bell crank disposed to pivot about a horizontal pin and having one arm disposed substantially horizontally and another arm depending substantially downwardly;

said cradle means mounted on the end of said horizontal arm of said bell crank;

a fluid piston and cylinder assembly disposed and connected to the end of said other arm of said bell crank.

8. The apparatus of claim 7 wherein said mounting means further comprises:

an open box structure having a bottom panel, two opposing side panels and a front panel, wherein said front panel is fixedly mounted to said respective arm of said pair of arms;

said piston and cylinder assembly mounted within said box and disposed substantially parallel to said bottom panel;

said pin extending inward from said side panel;

a pair of wing plates, each extending outwardly from the respective one of said side panels;

said caster being fixedly mounted under each one of said wing plates.

9. The apparatus of claim 7 wherein:

said frame has at least one annular plate;

said wheel means having a round plate, bearing mounted coaxially onto said annular plate to rotate therewith;

said wheel of said wheel means is mounted to said round plate to rotate about a horizontal axis perpendicular to said round plate;

a power means is mounted to said round plate; and means are provided for coupling power from said power means to said wheel of said wheel means.

10. The apparatus of claim 7 wherein:

said arms are mounted to said frame to allow said arms to move toward and away from each other in a scissor-like action.

11. The apparatus of claim 1 wherein:

said frame has two axially spaced annular plates, axially aligned on said vertical axis;

a plurality of rollers are mounted between said annular plates, equally distant from the vertical axis thereof, and disposed to rotate about respective axes which are parallel to said vertical axis thereof;

a round plate having said wheel means mounted thereon is disposed coaxially between said annual plates;

thrust bearings are provided between each of said annular plates and said round plate.

12. The apparatus of claim 11 wherein:

a pair of pins are disposed on opposite sides of said annual plates and extending therebetween;

said arms are pivotably connected to said pins, respectively; and means are provided to move said arms towards and away from each other, in scissor-like fashion, and to lock said arms with respect to each other, and said frame.

13. The apparatus of claim 12 wherein said mounting means further comprises:

an open box structure having a bottom panel, two opposing side panels and a front panel, wherein said front panel is fixedly mounted to said respective arm of said pair of arms;

said piston and cylinder assembly mounted within said box and disposed substantially parallel to said bottom panel;

said pin extending inward from said side panel;

a pair of wing plates, each extending outwardly from the respective one of said side panels;

said caster being fixedly mounted under each one of said wing plates.

14. The apparatus of claim 1 wherein:

said arms are mounted to said frame to allow said arms to move toward and away from each other in a scissor-like action.

* * * * *